United States Patent [19]

Reifenhäuser et al.

[11] Patent Number: 4,911,868
[45] Date of Patent: Mar. 27, 1990

[54] PROCESS AND APPARATUS FOR MAKING A THERMOPLASTIC FOIL

[75] Inventors: Hans Reifenhäuser, Troisdorf; Wilhelm Predöhl, Hennef-Bööl, both of Fed. Rep. of Germany

[73] Assignee: Reifenhauser GmbH & Co. Maschinenfabrik, Troisdorf, Fed. Rep. of Germany

[21] Appl. No.: 276,267

[22] Filed: Nov. 25, 1988

[30] Foreign Application Priority Data

Nov. 26, 1987 [DE] Fed. Rep. of Germany ....... 3740088

[51] Int. Cl.⁴ ............................................. B29C 47/92
[52] U.S. Cl. .................................. 264/40.2; 264/40.5; 425/141; 425/172
[58] Field of Search ................... 264/40.1, 40.2, 40.5, 264/40.7; 425/141, 140, 172, 135

[56] References Cited

U.S. PATENT DOCUMENTS

| 3,940,221 | 2/1976 | Nissel | 425/141 |
| 4,281,980 | 8/1981 | Hoagland et al. | 264/40.1 |
| 4,464,319 | 8/1984 | Halter et al. | 264/40.1 |
| 4,514,348 | 4/1985 | Iguchi et al. | 264/40.2 |
| 4,592,710 | 6/1986 | Reifenhäuser et al. | 425/141 |
| 4,594,063 | 6/1986 | Reifenhäuser et al. | 425/141 |
| 4,721,447 | 1/1988 | Erckmann | 264/40.5 |
| 4,758,390 | 7/1988 | Henze | 264/40.2 |

FOREIGN PATENT DOCUMENTS

| 3427915 | 3/1986 | Fed. Rep. of Germany. | |
| 2162118A | 7/1984 | United Kingdom | 425/141 |
| 2162119A | 7/1984 | United Kingdom | 425/141 |

Primary Examiner—Jeffery Thurlow
Attorney, Agent, or Firm—Herbert Dubno

[57] ABSTRACT

The process for making a thermoplastic foil involves the use of a wide-outlet or long-slit die which has at least one outlet-gap-defining adjustable die lip, an opposing gap-bounding lip and a group of piezotranslators distributed over the length of the outlet-gap-defining adjustable die lip, each of which is part of a control loop, acts as a positioning member and is associated with an individual section of an outlet-gap-defining adjustable die lip. At least one actual value of the foil thickness of the thermoplastic foil formed is measured with a measuring device and is fed to a controlling processor. Each of the piezotranslators is controlled by a controlling processor with a controlling variable. In the controlling processor a distribution control variable which is generated by a thickness variation or error is generated by a control variable deviating from a setpoint value and the distribution control variable is fed to individual piezotranslators from the controlling processor according to a distribution function which distributes the thickness errors over the length of the adjustable outlet-gap-defining adjustable die lip.

6 Claims, 1 Drawing Sheet

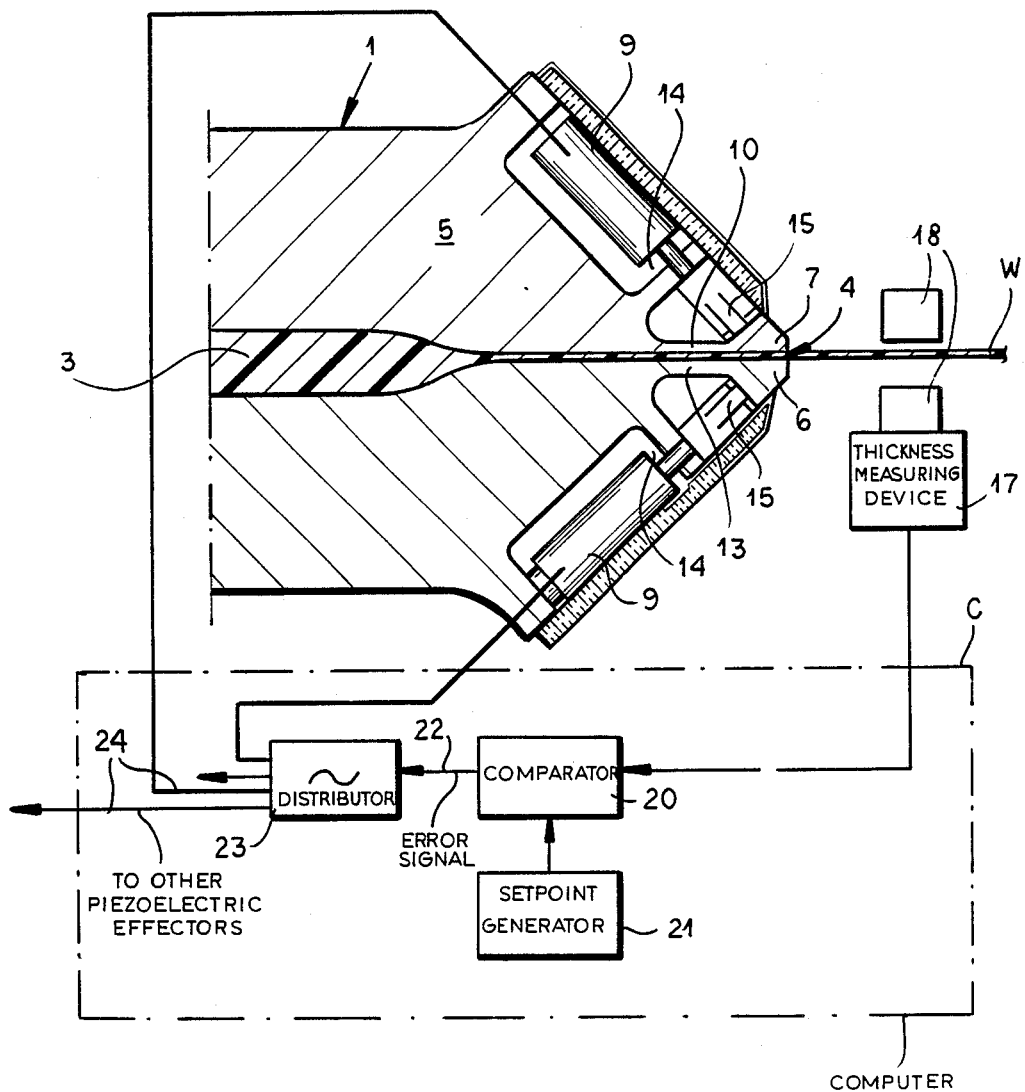

PROCESS AND APPARATUS FOR MAKING A THERMOPLASTIC FOIL

FIELD OF THE INVENTION

Our present invention relates to a process and apparatus for making a thermoplastic foil.

BACKGROUND OF THE INVENTION

A process for making a thermoplastic foil with a wide-outlet or long-slit die, which has at least one outlet-gap-defining adjustable die lip, an opposing gap-bounding lip and a row of piezotranslators distributed over the length of the outlet-gap-defining adjustable die lip described in the commonly owned U.S. Pat. Nos. 4,594,063 and 4,721,447.

Each piezotranslator is part of a control loop, acts as a positioning member or effector and is associated with an individual section of the outlet-gap-defining adjustable die lip.

At least one actual value of the foil thickness of the thermoplastic foil formed is measured with a measuring device and is fed to a controlling processor.

Each of the piezotranslators is controlled by the controlling processor with a controlling variable. These foils are denoted planar or flat foils.

The expression "controlling processor" means a computer in which a controller is an integral part. The computer is programmed so that the manufacture of different plastic foils can be commanded. It sends commands to the controller.

The piezotranslator is a positioning element or effector which operates according to the piezoelectric principle. Thus by application of an electrical potential the length of a piezotranslator is changed directly from a fraction of a millimeter to about a millimeter. The extension of the length of the piezotranslator is a result of changes in the crystal structure of the individual piezoelectric elements which react themselves and together cause the length extension. In this way, the prerequisites for a very exact fine adjustment of the adjustable die lip are provided.

Reaction times in the vicinity of milliseconds and, depending on the voltage or potential, longitudinal extensions in every required size range are attainable.

The measuring device is part of a control loop which measures the thickness of the web of cooled foil. The values thus measured are fed to the controlling processor which calculates and then produces the controlling voltage for the individual piezotranslators.

The output-gap-defining die lip is generally connected to the rest of the extruder by a flexible deformable component or ligature in the scope of the invention and also is elastically deformable in its boundaries. That is also true in this invention. Also, the opposing gap-bounding lip can be formed as described as an adjustable die lip.

In the known process, the controlling variables are fed directly to the piezotranslators upon comparison of the setpoint thickness value with the actual measured thickness value (German Patent 34 27 915). Thus the same control response is effective over the entire width of the plastic foil.

The foil thickness may be measured over the entire width of the foil, e.g. with a measuring unit movable back and forth over the width of the plastic foil, and the piezotranslators associated with the individual sections of the opposing gap-bounding lip are suitably controlled in this fashion but with identical response.

However, it has been found that comparatively large systematic thickness errors can occur. The systematic errors are mainly due to unavoidable manufacturing and assembly tolerances of the mechanical parts and can also be based on special phenomenon in the flow of the thermoplastic material.

They may be minimized currently but that process is very expensive. If the foil is rolled or wound up into a coil, these thickness errors from foil layer to foil layer add in individual regions of the coil and the finished coil shows an incompletely cylindrical surface With disturbing raised rings, namely so-called "barrel-hop bulges". In making the blown foil these disturbing phenomenon can be prevented since the blowing die or the parts of the surface-forming device for the foil tube move cyclically so that the systematic errors in the coil are distributed over the entire width of the coil and any systematic thickenings themselves can no longer add up to disturbing barrel-hoop bulges. In the foil made from plastic which are made with the wide-outlet or long-slit die that is not possible.

OBJECTS OF THE INVENTION

It is an object of the invention to provide a process for making a thermoplastic foil with a wide-outlet or long-slit die in which troublesome systematic thickness variations or errors can no longer add in the coiled or rolled thermoplastic foil to form so-called "barrel-hoop bulges".

Another object of the invention is to provide an improved apparatus for this purpose.

SUMMARY OF THE INVENTION

These objects and others which will become more readily apparent hereinafter are attained in accordance with our invention in process for making a thermoplastic foil wherein in the controlling processor a distribution control variable which is generated by a thickness error or variation is generated by a control variable or error signal resulting from a deviation of the measured or actual thickness value from a setpoint value, and the distribution control variable is fed to individual ones of a row of piezotranslators from the controlling processor according to a distribution function which distributes the thickness errors over the length of the adjustable outlet-gap-defining die lip.

Thus in our invention additional thickness variations are intentionally generated in the foil artificially with a simple formula and these thickness variations are distributed over the width of the foil so that, on winding into a coil or roll in individual regions, an addition of these variations to form the "barrel-hoop bulges" no longer occurs.

According to the distribution function a statistical distribution is thus effected resembling that which occurs in making blown foil and as can be made by back and forth motion of the tool or the machine parts.

The artificial thickness variations vary within the predetermined thickness tolerances of the foil. The distribution function can be made to correspond to the winding process.

In the simplest case in the scope of the invention, the distribution function can be sinusoidal.

The distribution speed can be especially provided in the edge regions of the wide-outlet or long-slit die with the controlling processor so that a uniform distribution can be attained over the entire foil width in regard to the artificial thickness tolerances.

The distribution can be provided or arranged so that the time average of the local thickness variations of a winding process for the foil are sufficiently close to "zero" -- and of course at the latest when the desired winding process is finished. In this way a cylindrical roll is attained with a high speed. Surprisingly barrel-hoop bulges no longer form in the process according to our invention.

BRIEF DESCRIPTION OF THE DRAWING

The above objects, features and advantages of our/my invention will become more readily apparent from the following description, reference being made to the accompanying drawing the sole FIGURE of which is a cross-sectional view of a long-slit extrusion nozzle or head equipped with piezoelectric effectors for controlling respective sections of the die lips in accordance with the principles of the invention.

SPECIFIC DESCRIPTION

In the drawing, I have shown a broad slit extrusion die 1 of the type described, for example, in U.S. Pat. No. 4,594,063 or 4,721,447. This extrusion die generates a web W of thermoplastic material which may be relatively wide, i.e. may have a considerable dimension perpendicular to the plane of the drawing of the FIGURE.

The continuous web W emerges from the slot-like orifice 4 defined between a pair of die lips 6, 7 which are connected by flexible ligatures 10 and 13 with the remainder of the die body 5. The body is likewise formed with a passage receiving the thermoplastic material 3 from a worm-type of screw extruder of conventional design.

In compartments 14 above and below the respective lips 6 and 7, spaced apart in a direction perpendicular to the plane of the paper and as described in the aforementioned patents, rows of piezoelectric effectors or transducers 9 are provided and have their movable portions acting upon force transmittors 15 over respective segments of the length of each die lip.

In the standard operation of such systems, a contactless thickness measuring device 17 which operates by inductor, radiation or like principles with, for example, sensor points 18 straddling the web W, the thickness can be measured and an actual value signal can be generated for comparison with the setpoint signal to control the respective effectors. In the past, the thickness measuring device could scan back and forth across the width of the web and the pair of effectors 9 associated with the scanned region can be directly controlled in response to error signals should there be deviation of the measured value from the respective setpoint value.

Of course, where there were systematic errors of the type previously described, those systematic errors would remain and when the web upon final cooling was wound-up or coiled, bulges would be found in the coil which resembled barrel hoops.

To avoid this, in accordance with the invention, the output of the thickness measuring device 17, 18 is applied to the computer C which can include a comparator 20 receiving a setpoint signal from the setpoint generator 21. The setpoint generator may, of course, be a computer memory which estimates the setpoint based upon preselected data inputs to the computer, indicating the thickness and nature of the thermoplastic which is extruded. According to the invention, the error signal outputted at 22, rather than being used directly to control the respective effectors or piezoelectric transducers 9, is applied to the distributor 23 in which an intentional thickness deviation within the acceptable tolerances for thickness variation of the finished product, is imposed upon the error signal delivered at 22 so that the outputs 24 to the piezoelectric transducers are varied in a cyclical pattern, e.g. a sinusoidal pattern as shown by the distributor from transducer to transducer along each row. In effect, therefore, without movement of the transducers or the web in the transverse direction, a cyclical signal is swept across the web with an artificially generated thickness variation to prevent systematic error from being concentrated along one longitudinal strip of the web and thereby resulting in barrel-hoop bulges in the coiled web.

We claim:

1. In a process for making a thermoplastic foil with a wide-outlet die which has at least one outlet-gap-defining adjustable die lip, an opposing gap-bounding lip and a group of piezotranslators distributed over the length of said outlet-gap-defining adjustable die lip, each of which is part of a control loop, acts as a positioning member and is associated with an individual section of an outlet-gap-defining adjustable die lip, at least one actual value of the foil thickness of said thermoplastic foil formed being measured with a measuring device and being fed to a controlling processor and each of said piezotranslators being controlled by said controlling processor with controlling variables, the improvement wherein in said controlling processor a distribution control variable which is generated by a thickness variation measured as a control variable deviating from a setpoint value and said distribution control variable is fed to individual ones of said group of said piezotranslators from said controlling processor according to a distribution function which distributes said thickness variations over said length of said adjustable outlet-gap-defining adjustable die lip thereby eliminating barrel-hoop bulges.

2. The improvement defined in claim 1 in which said distribution function is sinusoidal.

3. The improvement defined in claim 1 wherein a local time average of said thickness variations in another process involving coiling said thermoplastic foil is sufficiently close to "zero".

4. A process for making a thermoplastic foil with a wide-outlet die which has at least one adjustable outlet-gap-defining die lip, an opposing gap-bounding lip and a group of piezotranslators distributed over the length of said outlet-gap-defining adjustable die lip, each of which is part of a control loop, acts as a positioning member and is associated with an individual section of an outlet-gap-defining adjustable die lip comprising:
  (a) measuring at least one actual value of the foil thickness in said thermoplastic foil formed;
  (b) feeding the measured value of said foil thickness to a controlling processor;
  (c) controlling each of said piezotranslators with said controlling processor with a controlling variable;
  (d) generating a distribution control variable in said controlling processor on detecting a thickness error or variation as evidenced by a control variable deviating from a setpoint value; and
  (e) inputting said distribution control variable to individual ones of said group of said piezotranslators from said controlling processor according to a distribution function which distributes said thickness errors over said length of said adjustable outlet-gap-defining die lip thereby eliminating barrel-hoop bulges.

5. An apparatus for making a foil from thermoplastic synthetic resin comprising:

a long slit-extrusion die having a slot-like die orifice defined between a pair of linearly extending lips between which a thermoplastic web is extruded, at least one of said lips being provided with a row of piezoelectric transducers electrically energizable to shift respective segments of said one of said lips;

thickness measuring means downstream of said die generating actual thickness measurement signals representing measured thickness of said web;

means connected to said thickness measuring means and receiving a setpoint value of web thickness for comparing said signal with said setpoint value and generating a control signal representing displacement by said transducers of respective segments of said one of said lips for control of the thickness of said web and means for superimposing on said transducers an artificial thickness variation distributed over the transducers of said row in accordance with a predetermined distribution function for preventing systematic thickness variations from being contacted along singular longitudinal strips of said web and from accumulating upon coiling of said web in barrel-hoop bulges.

6. The apparatus defined in claim 5 wherein said distribution function is a sinusoidal function.

* * * * *